United States Patent
Cotta et al.

(10) Patent No.: US 12,337,741 B2
(45) Date of Patent: Jun. 24, 2025

(54) SOUND CONTROL SYSTEM FOR A SEAT

(71) Applicant: SAFRAN SEATS, Plaisir (FR)

(72) Inventors: Gérald Cotta, Moissy Cramayel (FR); Denis Manceau, Moissy Cramayel (FR)

(73) Assignee: Safran Seats, Plaisir (FR)

( * ) Notice: Subject to any disclaimer, the term of this patent is extended or adjusted under 35 U.S.C. 154(b) by 238 days.

(21) Appl. No.: 18/038,849

(22) PCT Filed: Nov. 10, 2021

(86) PCT No.: PCT/EP2021/081252
§ 371 (c)(1),
(2) Date: May 25, 2023

(87) PCT Pub. No.: WO2022/112004
PCT Pub. Date: Jun. 2, 2022

(65) Prior Publication Data
US 2024/0017654 A1    Jan. 18, 2024

(30) Foreign Application Priority Data
Nov. 26, 2020   (FR) .................................. FR2012190

(51) Int. Cl.
*B60N 2/879* (2018.01)
*B60N 2/00* (2006.01)
(Continued)

(52) U.S. Cl.
CPC .............. *B60N 2/879* (2018.02); *B60N 2/002* (2013.01); *B64D 11/0646* (2014.12); *H04R 1/025* (2013.01)

(58) Field of Classification Search
CPC ..... B60N 2/879; B60N 2/002; B64D 11/0646
See application file for complete search history.

(56) References Cited

U.S. PATENT DOCUMENTS

2019/0349683 A1* 11/2019 Anders ................... H04S 7/307
2019/0355339 A1   11/2019 Seffernick et al.

FOREIGN PATENT DOCUMENTS

CN        106274673 A  *  1/2017  ............. B60N 2/002
EP           2725575 A1     4/2014
(Continued)

OTHER PUBLICATIONS

International Patent Application No. PCT/EP2021/081252, International Search Report and Written Opinion dated Feb. 23, 2022, 11 pages (9 pages of original document and 2 pages of English translation).
(Continued)

*Primary Examiner* — Anthony D Barfield
(74) *Attorney, Agent, or Firm* — Kilpatrick Townsend & Stockton LLP

(57) ABSTRACT

The present invention relates to a passenger seat (10), in particular for an aircraft cabin, comprising: —a headrest (11), —a backrest (12), —a seat member (13) and—at least one loudspeaker (18) for broadcasting a sound signal to a passenger, —the passenger seat (10) further comprising: —at least one detection means (20) for detecting the presence of the passenger or a part of the passenger's body, and—a control unit (24) configured to selectively command the activation or deactivation of the loudspeaker (18) and/or the modification of a characteristic of a sound signal broadcast by the loudspeaker (18) in accordance with at least one information item from: —an information item relating to the presence of the passenger or a part of the passenger's body determined using the detection means (20), or—an information item concerning the state of the aircraft cabin or aircraft.

18 Claims, 5 Drawing Sheets

(51) Int. Cl.
  *B64D 11/06* (2006.01)
  *H04R 1/02* (2006.01)

(56) References Cited

FOREIGN PATENT DOCUMENTS

| FR | 3064557 A1 | 10/2018 | |
|---|---|---|---|
| KR | 0111769 Y1 * | 5/1999 | ............... H03G 3/32 |
| WO | WO-2016194945 A1 * | 12/2016 | ............... B60N 2/80 |

OTHER PUBLICATIONS

International Patent Application No. PCT/EP2021/081252, English Translation of the Written Opinion of the International Searching Authority, dated May 30, 2023.

* cited by examiner

[Fig 1]
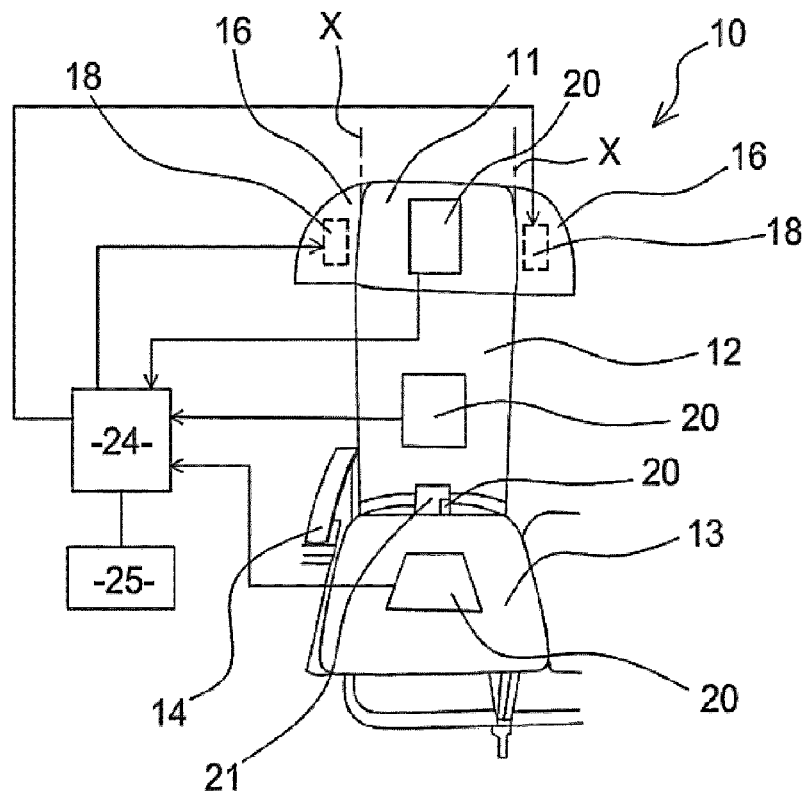
[Fig 2a]
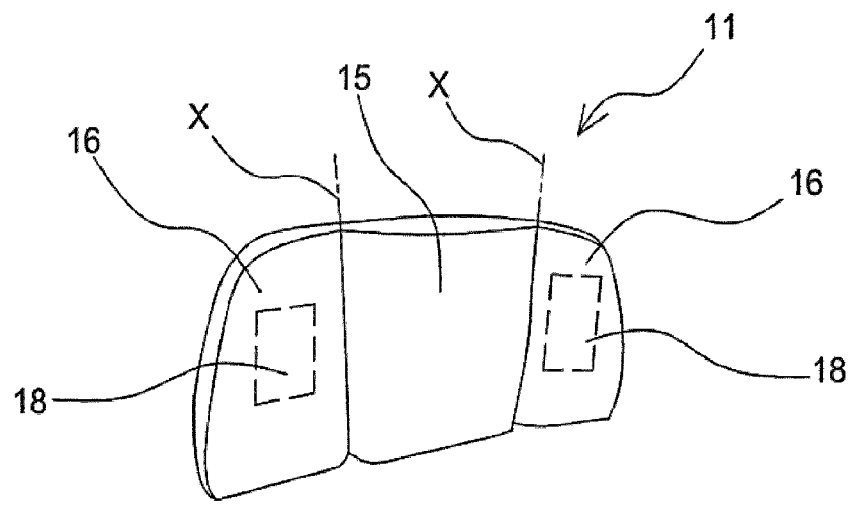

[Fig 2b]
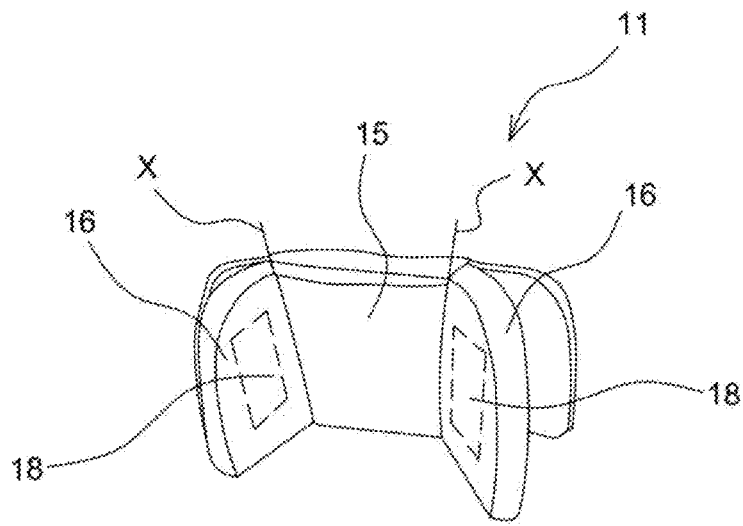
[Fig 3]
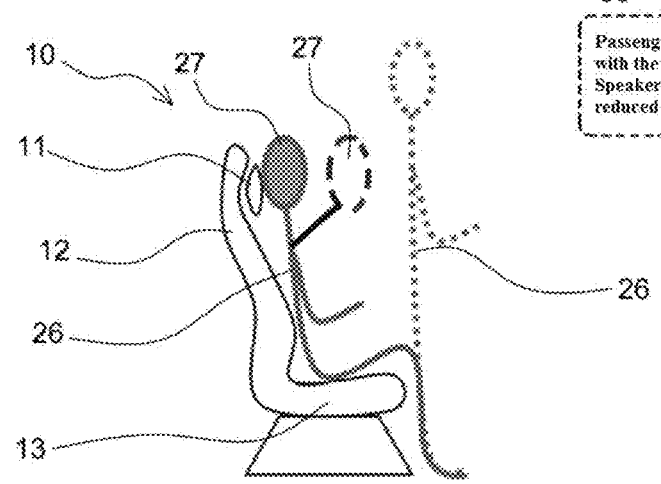

[Fig 4]
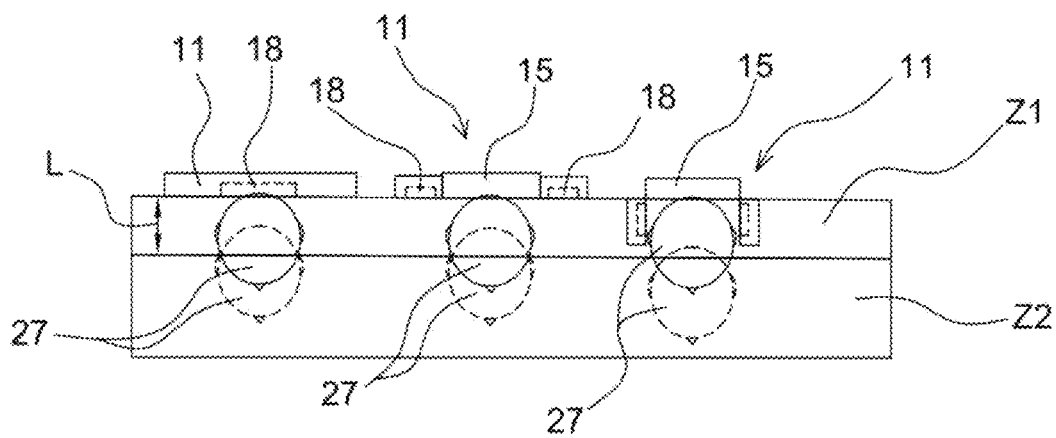
[Fig 5a]
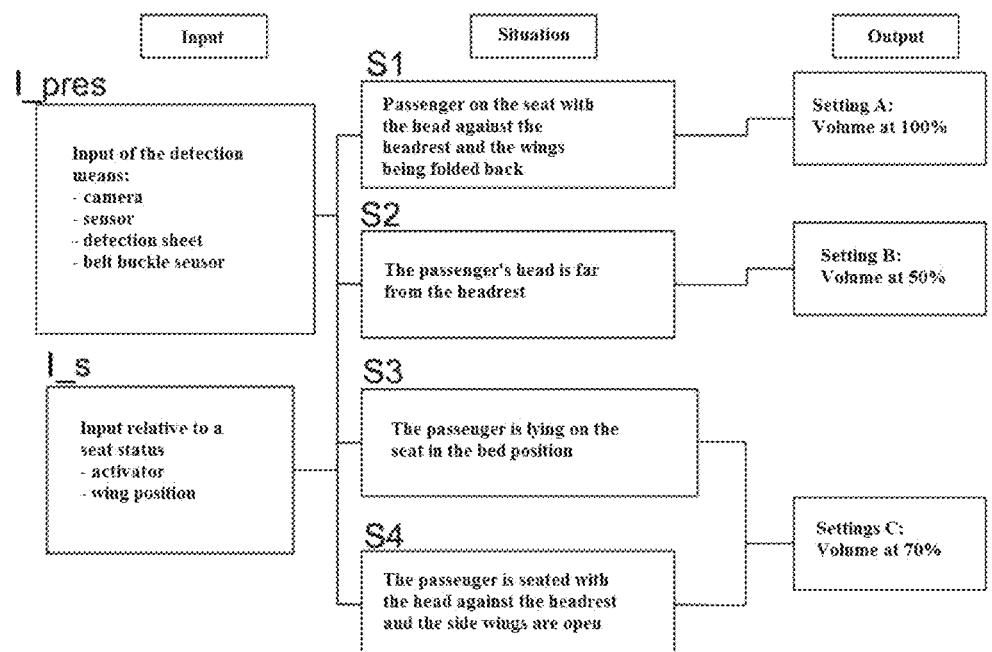

[Fig 5b]
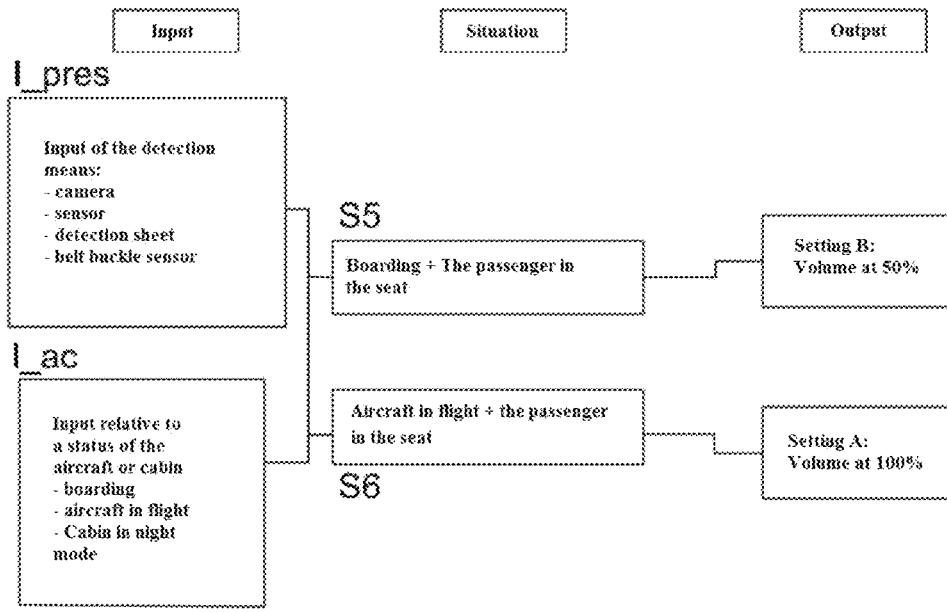
[Fig 5c]
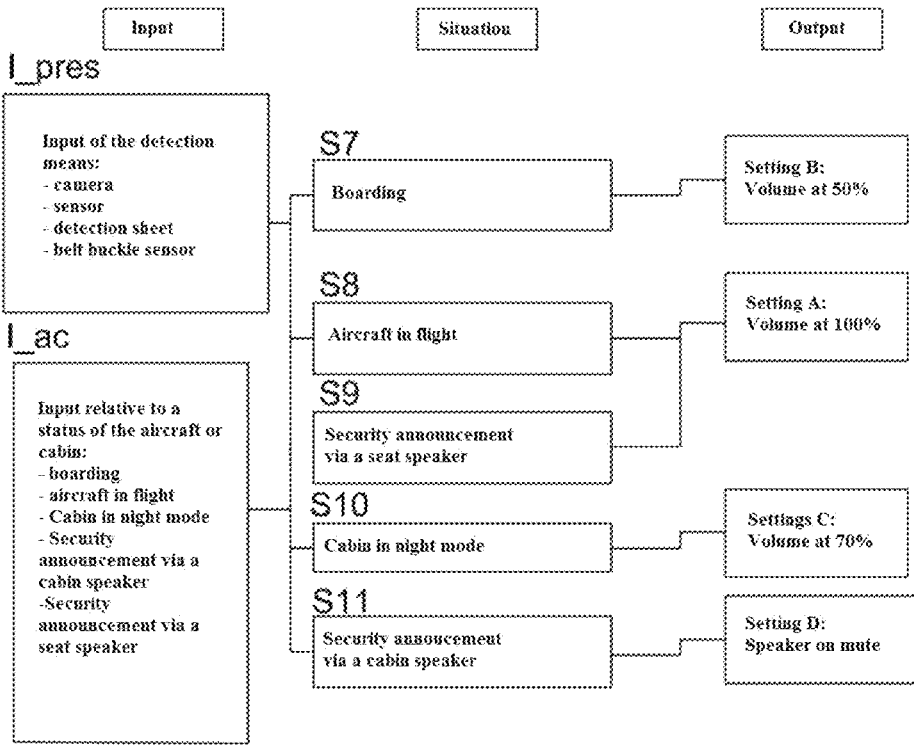

[Fig 6]
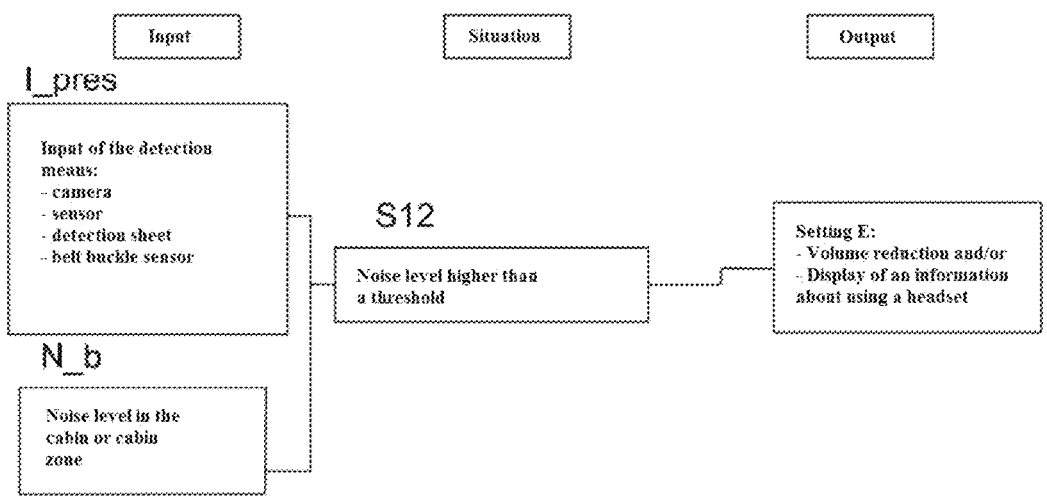

SOUND CONTROL SYSTEM FOR A SEAT

The present invention relates to a sound control system for a seat. The invention finds a particularly advantageous, but not exclusive, application with aircraft seats but could also be implemented with the seats of other means of transport, in particular cars or ships.

Generally, the passenger of an aircraft uses a headset to listen to multimedia content (music or films) offered by an IFE (for "In-Flight Entertainment") type system. However, wearing an audio headset for a long flight, in particular during an ultra-long-haul flight, becomes disturbing for the passenger. Indeed, after a few hours placed on the head, a headset begins to become heavy and oppressive for the passenger.

There are audio systems without any headset for car seats that offer a good level of sound quality and good intelligibility of film dialogues. However, in certain life situations, these systems are likely to generate potentially loud noise that could disturb other passengers. In particular, it has been observed that when the passenger is not in a seated position or the passenger's head is not in contact with the headrest, neighboring passengers may hear more of the sound generated by the loudspeakers in the headrest of the seat. This is because the passenger's body, particularly his/her head, absorbs some of the sound from the speakers when seated, and this sound absorption effect disappears when the passenger leaves his/her seat.

Document GB1918524.8 describes a system for activating a noise cancellation mode when the passenger falls asleep. However, this document does not teach a specific control of the loudspeakers according to a general state of the cabin.

The invention aims to effectively remedy the aforementioned drawbacks by proposing a passenger seat, in particular for an aircraft cabin, comprising:
 a headrest,
 a seat back,
 a seating surface, and
 at least one loudspeaker for broadcasting a sound signal for a passenger,
 said passenger seat further comprising:
 at least one means of detecting the presence of the passenger or a part of the passenger's body, and
 a control unit configured to selectively control an activation or a deactivation of the loudspeaker and/or a modification of a characteristic of a sound signal broadcast by the loudspeaker according to at least one information among:
 an information relating to the presence of the passenger or a part of the passenger's body determined with the help of the detection means, or
 an information relating to the status of the aircraft or cabin,
 the control unit being configured in such a way that when it detects that the passenger leaves his/her seat or that the passenger's head moves away or moves relative to the headrest, said control unit is able to command a deactivation of the loudspeaker, or a reduction in the sound volume of the loudspeaker, and
 when the control unit detects that the passenger returns onto his/her seat or that the passenger's head returns close to the headrest, the control unit is configured to reactivate automatically, without any action by the passenger, the loudspeaker or increase the sound to a level previously set by the passenger.

The invention thus makes it possible to effectively adapt, depending on the presence or absence of the passenger or the state of the aircraft cabin or of the aircraft, the activation of the loudspeakers and/or a characteristic of the signal sound of a solution without headset, in particular the sound volume, in order to avoid disturbing neighboring passengers. The invention also makes it possible to adapt an activation of the loudspeakers and/or a characteristic according to the life situation of the aircraft or of the cabin, in particular to ensure that the messages of the cabin crew, in particular safety messages, are properly received by all passengers on the aircraft.

According to one embodiment of the invention, the modified characteristic of the sound signal is a volume of the sound signal and/or one or more frequencies of the sound signal.

According to one embodiment of the invention, the control unit is configured to also control a display of a message, for example on a screen of a multimedia system, indicating that a deactivation of the loudspeaker and/or a modification of a characteristic of the sound signal generated by the loudspeaker has been controlled by the control unit.

According to one embodiment of the invention, the detection means is chosen from: a camera, a detection sensor, in particular of the inductive, capacitive, piezoelectric, infrared type, or a detection sheet, in particular of the inductive, capacitive type, piezoelectric, infrared type.

According to one embodiment of the invention, said seat comprises a plurality of detection means, the output signals of which are intended to be correlated by the control unit to confirm the information relating to the presence of the passenger or a part of the passenger's body.

According to one embodiment of the invention, one or more detection means are arranged inside at least one element of the seat among: the headrest, the seating surface, the seat back, an armrest, or a seat belt buckle.

According to one embodiment of the invention, at least one of the detection means, in particular a camera, is arranged in a shell, or in the aircraft cabin close to the seat.

According to one embodiment of the invention, at least one loudspeaker is integrated in the headrest.

According to one embodiment of the invention, at least one loudspeaker is integrated in a side wing of the headrest and/or in a central portion of the headrest.

According to one embodiment of the invention, at least one loudspeaker is integrated in the seat, the seat back, or an armrest, or in a privacy shell of the seat.

According to one embodiment of the invention, the control unit is configured to control a sound setting of the loudspeaker(s) at an optimal sound volume in the event that an announcement from the cabin crew, in particular a safety announcement, should be made via the seat speaker(s).

According to one embodiment of the invention, the control unit is configured to control a muting of the seat loudspeaker(s) in the event that an announcement from the cabin crew, in particular a safety announcement, must be made via an aircraft cabin loudspeaker.

According to an embodiment of the invention, the control unit is configured to reduce a sound volume of the loudspeaker(s) of the headrest and/or display a message advising the passenger to switch to a use with a headset when a noise level in the cabin or a region of the cabin exceeds a predetermined threshold.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein:

FIG. 1 is a view of a seat according to the invention comprising loudspeakers as well as sensors for the presence of a passenger or a part of the passenger's body;

FIGS. 2a and 2b are perspective views of a headrest with integrated loudspeakers according to the invention respectively in the open position and the folded position;

FIG. 3 is a schematic representation illustrating the control of the sound of the speakers of the seat according to the presence or not of the passenger on a seat;

FIG. 4 is a schematic representation illustrating the control of the sound of the speakers of the seat according to the presence of the passenger's head near a headrest of the seat;

FIGS. 5a to 5c are diagrams illustrating the selection of a loudspeaker sound setting according to different situations detected from the inputs taken into account by the control unit;

FIG. 6 is a diagram illustrating an embodiment implementing a noise level detection system in the cabin or in an area of the cabin.

It should be noted that, in the figures, the structural and/or functional elements common to the different embodiments may have the same references. Thus, unless otherwise stated, such elements have identical structural, dimensional and material properties.

FIG. 1 shows a passenger seat 10 intended to be installed in an aircraft cabin. This seat 10 comprises a headrest 11, a seat back 12, and a seating surface 13. As can be seen in FIGS. 2a and 2b, the headrest 11 may comprise a central portion 15 and two side wings 16 arranged either side of the central portion 15 and articulated around an axis of rotation X, via a hinge, with respect to the central portion 15.

At least one loudspeaker 18 intended to broadcast audio content may be integrated into the headrest 11. By "integrated" it is meant that the loudspeaker 18 may be fixed directly or indirectly by means of a housing to a structural element of the headrest 11. It is possible to integrate one or more loudspeakers 18 into a side wing 16 of the headrest 11.

A lateral wing 16 of the headrest 11 may be able to rotate between an open position in which the side wings 16 are located substantially in the same plane as the central portion 15, that is to say that a side wing 16 forms an angle of less than 10 degrees with respect to the plane in which the central portion 15 extends (cf. FIG. 2a), and a folded position in which a side wing 16 forms a non-zero angle, in particular between 60 degrees and 80 degrees, relative to the plane in which the central portion 15 extends (cf. FIG. 2b).

Thus, by passing the side wings 16 from the open position to the folded position, the user will be able to bring the loudspeakers 18 closer to his/her ears in order to improve the sound reproduction of the system.

Alternatively or in addition, one or more loudspeakers 18 could be integrated into the central portion 15 of the headrest 11. It is also possible to envisage the integration of one or more loudspeakers 18 into other parts of the seat 10, such as the seating surface 13, the seat back 12, or an armrest 14, or in a privacy shell of the seat 10 or in the cabin near the seat 10.

As illustrated in FIG. 1, the seat 10 further comprises at least one means 20 for detecting the presence of a passenger or a part of the passenger's body. The detection means 20 is chosen from: a camera, a detection sensor, in particular of the inductive, capacitive, piezoelectric, infrared type, or a detection sheet, in particular of the inductive, capacitive, piezoelectric, infrared type. The detection sheet is a two-dimensional component comprising a plurality of elementary detectors.

The detection means 20 may be arranged inside at least one element of the seat 10 among: the headrest 11, the seating surface 13, the seat back 12. The detection means 20 may be arranged behind a cover protection or behind a layer of foam of the headrest 11, the seat back 12, or the seating surface 13.

In the case where the detection means 20 is arranged inside the headrest 11, the detection means 20 may be arranged in particular inside a side wing 16 of the headrest 11 or a central portion 15 of the headrest 11.

Alternatively, the detection means 20 may be placed inside a seat belt buckle 21 or an armrest 14 so as to detect the presence of a hand, an arm, or a finger of the passenger.

In the case of a camera, the latter could be placed in the aircraft cabin close to the seat 10. The camera could be configured so as to detect the passenger or only the passenger's head.

A control unit 24 is capable of selectively controlling an activation or a deactivation of the loudspeaker 18 and/or a modification of a characteristic of a sound signal generated by the loudspeaker 18 as a function of information among: an information I_Pres relating to a presence of the passenger or a part of the passenger's body determined with the help of the detection means 20 or an information I_ac of the state of the aircraft or the cabin.

According to certain embodiments, it is possible to use a plurality of detection means 20 whose output signals are intended to be correlated by the control unit 24 to confirm the information I_Pres relating to the presence or absence of the passenger or part of the passenger's body. The multiple detectors can be of the same type or different types.

Advantageously, the modified characteristic of the sound signal is a volume of the sound signal. As a variant or in addition, it would however be possible to modify one or more frequencies of the sound signal.

The control unit 24 can be configured to also control a message display, for example on a screen 25 of a multimedia system (or IFE system for "Inflight Entertainment System") following a deactivation of the loudspeaker 18 and/or a modification of a characteristic of the sound signal generated by the loudspeaker 18.

In the embodiment illustrated in FIG. 3, the control unit 24 is configured in such a way that when it detects, in a life situation S1, that the passenger 26 is seated on the seat 10 and that his/her head 27 is located close to the headrest 11, the control unit 24 authorizes an activation of the loudspeaker 18 at an optimal sound volume. The passenger 26 will thus be able to adjust the sound volume to the desired level.

When the control unit 24 detects that the passenger 26 is seated on his/her seat but moves his/her head 27 away from the headrest 11 (situation S2) or that the passenger 26 gets out of his/her seat 10 (situation S3), said control unit 24 commands a deactivation of the loudspeakers 18, or a reduction in the sound volume of the loudspeakers 18. Alternatively, the control unit 24 may also vary one or more frequencies of the sound signal from the loudspeakers in a frequency band inaudible to neighboring passengers. As a variant, the control unit 24 could also command an automatic passage from a use without headset via the loudspeaker 18 to a normal use with headset.

When the control unit 24 detects that the passenger 26 returns to sit on his/her seat 10 or that the passenger's head 27 returns close to the headrest 11, the control unit 24 automatically reactivates, without action from the passenger, the loudspeakers 18 or increases the sound to the level previously set by the passenger. Thus, the implementation of the method is totally transparent for the passenger.

According to a simplified implementation, the control unit 24 only detects the presence or absence of the passenger on his/her seat 10 and initiates the aforementioned control actions of the loudspeakers according thereto.

FIG. 4 illustrates the detection zone Z1 in which it is considered that the passenger's head 27 is close to the headrest 11. This detection zone Z1 may have a width L between 5 and 20 cm measured with respect to a support face of the headrest 11. A detection zone Z1 can be adjusted according to a configuration of the headrest 11 and of the loudspeaker(s) 18.

When the passenger's head 27 leaves the zone Z1 and enters the zone Z2, the control unit 24 detects that the passenger is moving his/her head 27 away from the headrest 11. The control unit 24 then orders a deactivation loudspeakers 18 or a reduction in the sound volume of the loudspeakers 18 in order to avoid disturbing neighboring passengers.

The detection zone Z1 may be implemented with a headrest 11 with side wings 16 or without side wings.

FIGS. 5a to 5c illustrate different situations that can be detected by the control unit 24 as a function of system input as well as a selection of a sound setting for the loudspeakers 18 of the headrest 11. Settings can be pre-selected. It is possible, for example, to provide five pre-selected settings (A-E settings) described in more detail below.

In the implementation in FIG. 5a, the control unit 24 takes into account an information I_Pres relating to the presence of the passenger 26 via the signals received by the detection means 20 as well as an information I_s relating to a state of the seat 10. The state of the seat 10 is defined by the position of the seat 10 which may be in the seated position 13 or in the bed position as well as by the position of the side wings 16 of the headrest 11. For this purpose, position sensors can be installed at the level of the actuators of the seat 10 and at the level of the hinges of the side wings 16.

In the event that the system detects, in a situation S1, that the passenger 26 is seated on the seat 10 with his head resting against the headrest 11 and that the side wings 16 are in the folded position, the unit control 24 will be able to select a first setting A of the loudspeakers 18 at an optimal sound volume (sound level at 100%), in particular around 60 dB. This sound volume is configurable by a tuning parameter.

In the event that the system detects, in a situation S2, that the passenger 26 has no longer his/her head against the headrest 11, the control unit 24 can select a second setting B of the loudspeakers 18 to a sound volume lower than the optimum sound volume, for example a sound volume of the order of 50%. This sound volume is configurable by a tuning parameter.

In the event that the system detects, in a situation S3, that the passenger 26 is lying in the seat 10 in the bed position, the control unit 24 can select a third setting C of the loudspeakers 18 at a sound volume lower than the optimal sound volume but higher than the sound volume of setting B, for example at a sound volume of the order of 70%. This sound volume is configurable by a tuning parameter.

If the system detects, in a situation S4, that the passenger 26 is seated on the seat 10 while the side wings 16 are in the open position, the control unit 24 can also select the third setting C.

In the implementation in FIG. 5b, the control unit 24 takes into account an information I_Pres relating to the presence of the passenger 26 or a part of his/her body, in particular the head, via the signals received by one or more of the detection means 20 as well as an information I_ac relating to a state of the aircraft or of the cabin. This information I_ac relating to a state of the aircraft or the cabin may in particular consist of an information relating to a boarding phase of the aircraft, an information relating to a flight phase of the aircraft, or an information relating to a cabin night mode.

The control unit 24 will thus be able to select a setting for the loudspeakers 18 as a function of a combination of the information I_Pres relating to the presence of the passenger 26 and the information I_ac relating to a state of the aircraft or the cabin. The information I_ac relating to the state of the aircraft or the cabin is managed by the cabin crew who can modify the state thereof.

In the event that the system detects, in a situation S5, that the aircraft is in a boarding phase and that the passenger 26 is seated on his/her seat 10, the control unit 24 will be able to select the second setting B of the loudspeakers 18.

In the event that the system detects, in a situation S6, that the aircraft is in a flight phase and that the passenger 26 is seated on his/her seat 10, the control unit 24 will be able to select the first adjustment A of the loudspeakers 18.

In the implementation in FIG. 5c, the control unit 24 takes into account an information I_Pres relating to the presence of the passenger 26 or a part of his/her body via the signals received by the detection means 20 as well as an information I_ac relating to a state of the aircraft or the cabin. The information I_ac relating to a state of the aircraft or the cabin may in particular consist of an information relating to a boarding phase of the aircraft, an information relating to a flight phase of the aircraft, an information relating to a night mode of the cabin, an information relating to the broadcasting of a safety message via the loudspeakers 18 of the seat 10, or an information relating to the broadcasting of a safety message via the loudspeakers 18 of the cabin.

In the event that the control unit 24 detects, in a situation S7, that the aircraft is in a boarding phase, the control unit 24 will be able to select the second setting B of the loudspeakers 18.

In the event that the system detects, in a situation S8, that the aircraft is in a flight phase, the control unit 24 can select the first setting A of the loudspeakers 18.

In the event that, in a situation S9, an announcement by the cabin crew, in particular a safety announcement, is to be made via the loudspeakers 18 of the seat 10, the control unit 24 also selects the first setting A of the loudspeakers 18 for broadcasting the announcement. The broadcast of the on-board staff announcement is made at an optimal sound volume regardless of the position of the passenger 26 with respect to the seat 10.

In the event that, in a situation S10, the control unit 24 detects that the cabin indicates that the cabin is in night mode, the control unit 24 selects the third setting C so as to limit the sound level to 70% volume. This helps reduce overall cabin noise. This sound level is configurable by a tuning parameter.

In the event that, in a situation S11, an announcement by the cabin crew, in particular a safety announcement, must be made, via loudspeakers 18 of the cabin, the control unit 24 commands a muting of the loudspeakers 18 of the headrest 11 (setting D: sound level at 0%), regardless of the position of the passenger 26 with respect to the seat 10.

It should be noted that, apart from the broadcast of messages of the cabin crew for which the sound levels of the loudspeakers 18 are imposed, the sound levels of the various settings A-D constitute maximum sound levels, the passenger being able to set a level sound level lower than default maximum sound level.

In the implementation in FIG. 6, a noise management system is provided for the entire cabin of the aircraft or specific regions of the cabin covering multiple seats 10.

In this case, a noise level detector N_b is used, for example a microphone connected to an input of the control unit 24. When the control unit 24 detects, in a situation S12, that the noise level N_b in the cabin or a region of the cabin exceeds a predetermined threshold, the sound level of the loudspeakers 18 of the headrest 11 (of all the seats 10 of the cabin or the seats 10 in the detected region) is reduced and/or a message is displayed to advise the passenger 26 to switch to a use with a headset (cf. setting E).

Of course, the different features, variants and/or embodiments of the present invention can be associated with each other in various combinations insofar as they are not incompatible with one another or exclusive from each other. Furthermore, the invention is not limited to the embodiments described above and provided solely by way of example. It encompasses various modifications, alternative forms and other variants that a person skilled in the art may consider in the context of the present invention and in particular all combinations of the various modes of operation described previously, which may be taken separately or in combination.

The invention claimed is:

1. A passenger seat, in particular for an aircraft cabin, comprising:
   a headrest,
   a seat back,
   a seating surface, and
   at least one loudspeaker for broadcast a sound signal for a passenger, characterized in that said passenger seat further comprises:
   at least one detection means for a presence of the passenger or a part of a body of the passenger, and
   a control unit configured to selectively control an activation or deactivation of the loudspeaker and/or a modification of a characteristic of a sound signal broadcast by the loudspeaker according to at least one information among:
   an information relating to the presence of the passenger or the part of the body of the passenger determined with the detection means, or
   an information relating to a status of the aircraft or cabin,
   the control unit being configured in such a way that when the control unit detects that the passenger leaves his/her seat or that a head of the passenger moves away or moves with respect to the headrest, said control unit is capable of controlling a deactivation of the loudspeaker, or a reduction in a sound volume of the loudspeaker, and
   when the control unit detects that the passenger returns onto his/her seat or that the head of the passenger returns close to the headrest, the control unit is configured to automatically reactivate, without passenger action, the loudspeaker or increase the sound to a level previously set by the passenger.

2. The seat according to claim 1, wherein the modified characteristic of the sound signal is a volume of the sound signal and/or one or more frequencies of the sound signal.

3. The seat according to claim 1, wherein the control unit is configured to additionally control a display of a message on a screen of a multimedia system indicating that a deactivation of the loudspeaker and/or a modification of a characteristic of the sound signal generated by the loudspeaker has been controlled by the control unit.

4. The seat according to claim 1, wherein the detection means is chosen from: a camera, a detection sensor, or a detection sheet.

5. The seat according to claim 4, wherein the detection means is the detection sensor.

6. The seat according to claim 5, wherein the detection sensor is an inductive-type detection sensor, a capacitive-type detection sensor, a piezoelectric-type detection sensor, or an infrared-type detection sensor.

7. The seat according to claim 4, wherein the detection means is the detection sheet.

8. The seat according to claim 7, wherein the detection sheet is an inductive-type detection sheet, a capacitive-type detection sheet, a piezoelectric-type detection sheet, or an infrared-type detection sheet.

9. The seat according to claim 1, further comprising a plurality of detection means, wherein output signals of the plurality of detection means are configured to be correlated by the control unit in order to confirm the information relating to the presence of the passenger or the part of the body of the passenger.

10. The seat according to claim 1, wherein the detection means are arranged inside at least one element of the seat among: the headrest, the seating surface, the seat back, an armrest, or a seat belt buckle.

11. The seat according to claim 1, wherein at least one detection means is arranged in a shell, or in the aircraft cabin close to the seat.

12. The seat according to claim 1, wherein at least one loudspeaker is integrated in the headrest.

13. The seat according to claim 12, wherein at least one loudspeaker is integrated in a side wing of the headrest and/or in a central portion of the headrest.

14. The seat according to claim 1, wherein at least one loudspeaker is integrated in the seat, the backrest, or an armrest, or in a seat privacy shell.

15. The seat according to claim 1, wherein the control unit is configured to control a sound setting of the at least one loudspeaker to a desired sound volume in the event that an announcement made via the at least one loudspeaker of the seat is by at least one cabin crew member.

16. The seat according to claim 1, wherein the control unit is configured to control muting of the at least one loudspeaker of the seat in the event that an announcement made via a loudspeaker in the aircraft cabin is by at least one cabin crew member.

17. The seat according to claim 1, wherein the control unit is configured to reduce a sound volume of the at least one loudspeaker of the headrest and/or display a message advising the passenger to switch to a use with a headset when a noise level in the cabin or a region of the cabin exceeds a predetermined threshold.

18. The seat according to claim 1, wherein the detection means is a camera.

* * * * *